United States Patent
Degen et al.

(10) Patent No.: US 11,966,569 B2
(45) Date of Patent: Apr. 23, 2024

(54) SYSTEMS AND METHODS FOR INTERACTING WITH OVERLAPPING REGIONS OF INTEREST IN MACHINE VISION APPLICATIONS

(71) Applicant: ZEBRA TECHNOLOGIES CORPORATION, Lincolnshire, IL (US)

(72) Inventors: Matthew M. Degen, Ridge, NY (US); Anthony P. DeLuca, Holbrook, NY (US); Christopher M. West, South Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/388,170

(22) Filed: Jul. 29, 2021

(65) Prior Publication Data
US 2022/0350467 A1    Nov. 3, 2022

Related U.S. Application Data

(60) Provisional application No. 63/182,524, filed on Apr. 30, 2021.

(51) Int. Cl.
*G06F 3/04842*    (2022.01)
*G06F 3/0481*    (2022.01)
(Continued)

(52) U.S. Cl.
CPC ........ *G06F 3/04842* (2013.01); *G06F 3/0481* (2013.01); *G06V 10/25* (2022.01);
(Continued)

(58) Field of Classification Search
CPC .... H04N 5/23206; H04N 7/183; H04N 23/62; H04N 23/661; G06F 3/0481; G06F 3/04842; G06V 10/945; G06V 10/25
See application file for complete search history.

(56) References Cited

U.S. PATENT DOCUMENTS

| 2011/0317906 A1* | 12/2011 | Wallack | G06K 9/6263 |
| | | | 382/141 |
| 2013/0141591 A1* | 6/2013 | Silver | G06F 3/0481 |
| | | | 348/169 |

(Continued)

FOREIGN PATENT DOCUMENTS

| EP | 2613240 A1 | 7/2013 |
| WO | 20200246639 A1 | 12/2020 |

OTHER PUBLICATIONS

Robert Natalia: "How to Easily Use Lightroom Tethering: What is Tethering?". Nov. 24, 2020 (Nov. 24, 2020), Seiten 1-11, XP093014030, https://expertphotography.com/lightroom-tethering/Gefunden im Internet:URL:https://web.archive.org/web/20201124231729/https://expertphotography.com/lightroom-tethering/ [gefunden am Jan. 13, 2023].

*Primary Examiner* — Andrea C Leggett
(74) *Attorney, Agent, or Firm* — Yuri Astvatsaturov

(57) ABSTRACT

Example systems and methods for interacting with overlapping regions of interest (ROIs) in machine vision applications are disclosed. An example system includes a machine vision camera, and a client computing device coupled to the machine vision camera. The client computing device configured to: receive an image from the machine vision camera; present the image on a canvas, wherein the canvas is part of a first user interface of a machine vision application displayed on the client computing device; present a first ROI associated with a first machine vision tool on the canvas; present a second ROI associated with a second machine vision tool on the canvas; and target the first ROI or the second ROI as a targeted ROI for interaction based upon distances from a pointer displayed on the canvas to features of the first ROI and the second ROI.

14 Claims, 11 Drawing Sheets

(51) Int. Cl.
*G06V 10/25* (2022.01)
*G06V 10/94* (2022.01)
*H04N 7/18* (2006.01)
*H04N 23/62* (2023.01)
*H04N 23/661* (2023.01)
*H04N 23/617* (2023.01)

(52) U.S. Cl.
CPC ........... *G06V 10/945* (2022.01); *H04N 7/183* (2013.01); *H04N 23/62* (2023.01); *H04N 23/661* (2023.01); *H04N 23/617* (2023.01)

(56) References Cited

U.S. PATENT DOCUMENTS

| | | | |
|---|---|---|---|
| 2016/0007026 A1* | 1/2016 | Dong | G06V 40/168 375/240.08 |
| 2017/0351338 A1* | 12/2017 | Bondan | G06F 3/03 |
| 2019/0034076 A1* | 1/2019 | Vinayak | G06T 19/20 |
| 2021/0405758 A1 | 12/2021 | Kim et al. | |

* cited by examiner

SYSTEMS AND METHODS FOR INTERACTING WITH OVERLAPPING REGIONS OF INTEREST IN MACHINE VISION APPLICATIONS

RELATED APPLICATION

This application claims the priority benefit of U.S. Provisional Patent Application Ser. No. 63/182,524, which was filed on Apr. 30, 2021. U.S. Provisional Patent Application Ser. No. 63/182,524 is hereby incorporated herein by reference in its entirety.

FIELD OF THE DISCLOSURE

This disclosure relates generally to machine vision applications, and, more particularly, to systems and methods for interacting with overlapping regions of interest in machine vision applications.

BACKGROUND

Over the years, industrial automation has come to rely heavily on machine vision components capable of assisting operators in a wide variety of tasks. In some implementations, machine vision components, like cameras, are utilized to track objects, like those which move on a conveyor belt past stationary cameras. Often, these cameras (also referred to as Imaging devices) interface with client devices (e.g., personal computers) which run corresponding applications operable to interact with these imaging devices at a wide variety of levels. In these applications, image manipulation and analysis is often routine and includes user interaction through the use of multiple regions of interest (ROIs) within those images. This, however, can be difficult to implement when multiple ROIs overlap to at least some extent. Thus, there is a need for improved devices, systems, and methods directed towards improving interactions with overlapping ROIs in machine vision applications.

SUMMARY

In an embodiment, a system for interacting with ROIs in a machine vision application includes a machine vision camera, and a client computing device coupled to the machine vision camera. The client computing device is configured to receive an image from the machine vision camera, present the image on a canvas, wherein the canvas is part of a first user interface of a machine vision application displayed on the client computing device, present a first ROI associated with a first machine vision tool on the canvas, present a second ROI associated with a second machine vision tool on the canvas, and target the first ROI or the second ROI as a targeted ROI for interaction based upon distances from a pointer displayed on the canvas to features of the first ROI and the second ROI.

In variations of this embodiment, the client computing device is further configured to, when the targeted ROI is selected by a first user input, modify the targeted ROI in response to a second user input to form a modified targeted ROI, and configure the machine vision camera to implement the machine vision tool associated with the targeted ROI based on the modified targeted ROI.

In variations of this embodiment, the client computing device is further configured to, when the targeted ROI is selected by the first user input, present a second user interface on the display for configuring the machine vision tool associated with the targeted ROI.

In variations of this embodiment, a feature of the first ROI is a first border, a feature of the second ROI is a second border, and the client computing device is further configured to target the targeted ROI for interaction by (i) when the pointer is over a label for the first ROI, targeting the first ROI as the targeted ROI, (ii) when the pointer is within only the first ROI, targeting the first ROI as the targeted ROI, (iii) when the pointer is within the first ROI and the second ROI, and the pointer is closer to the first border than to the second border, targeting the first ROI as the targeted ROI, and (iv) when the pointer is within the first ROI and the second ROI, is equidistant to the first border and to the second border, and is closer to a first center of the first ROI than to a second center of the second ROI, targeting the first ROI as the targeted ROI.

In variations of this embodiment, the client computing device is further configured to ignore the first ROI when at least one border of the first ROI is not displayed on the canvas.

In variations of this embodiment, a feature of the first ROI is a first center, a feature of the second ROI is a second center, and the client computing device is further configured to target the targeted ROI for interaction by (i) when the pointer is over a label for the first ROI, targeting the first ROI as the targeted ROI, (ii) when the pointer is within only the first ROI, targeting the first ROI as the targeted ROI, (iii) when the pointer is within the first ROI and the second ROI, and the pointer is closer to the first center than to the second center, targeting the first ROI as the targeted ROI, and (iv) when the pointer is within the first ROI and the second ROI, the pointer is equidistant to the first center and the second center, and the first ROI is smaller than the second ROI, targeting the first ROI as the targeted ROI.

In variations of this embodiment, the client computing device is further configured to receive a user configuration input, and select, based on the user configuration input, between (i) the features being boundaries of the first ROI and the second ROI and (ii) the features being centers of the first ROI and the second ROI.

In variations of this embodiment, the client computing device is further configured to receive a user configuration input, and select, based on the user configuration input, between (i) the features being boundaries of the first ROI and the second ROI, (ii) the features being centers of the first ROI and the second ROI, and (iii) the features representing which of the first ROI and the second ROI is selected or on top.

In variations of this embodiment, the client computing device is further configured to highlight the targeted ROI, target a different ROI as the targeted ROI when the pointer is moved around the canvas, and highlight the different ROI.

In another embodiment, a method for interacting with ROIs in a machine vision application includes presenting a first user interface on a display, the first user interface including a canvas, presenting a first ROI associated with a first machine vision tool on the canvas, presenting a second ROI associated with a second machine vision tool on the canvas, targeting the first ROI or the second ROI as a targeted ROI for interaction based upon distances from a pointer displayed on the canvas to features of the first ROI and the second ROI, modifying the targeted ROI in response to a first user input, and configuring a machine vision camera to implement the machine vision tool associated with the targeted ROI based on the modified targeted ROI.

In variations of this embodiment, the method further includes, when the targeted ROI is selected in response to a second user input, presenting a second user interface for configuring the machine vision tool associated with the targeted ROI.

In variations of this embodiment, a feature of the first ROI is a first border, a feature of the second ROI is a second border, and targeting the targeted ROI for interaction includes (i) when the pointer is over a label for the first ROI, targeting the first ROI as the targeted ROI, (ii) when the pointer is within only the first ROI, targeting the first ROI as the targeted ROI, (iii) when the pointer is within the first ROI and the second ROI, and the pointer is closer to the first border than to the second border, targeting the first ROI as the targeted ROI, and (iv) when the pointer is within the first ROI and the second ROI, is equidistant to the first border and to the second border, and is closer to a first center of the first ROI than to a second center of the second ROI, targeting the first ROI as the targeted ROI.

In variations of this embodiment, the method further includes ignoring the first ROI when at least one border of the first ROI is not displayed on the canvas.

In variations of this embodiment, a feature of the first ROI is a first center, a feature of the second ROI is a second center, and targeting the targeted ROI for interaction includes (i) when the pointer is over a label for the first ROI, targeting the first ROI as the targeted ROI, (ii) when the pointer is within only the first ROI, targeting the first ROI as the targeted ROI, (iii) when the pointer is within the first ROI and the second ROI, and the pointer is closer to the first center than to the second center, targeting the first ROI as the targeted ROI, and (iv) when the pointer is within the first ROI and the second ROI, the pointer is equidistant to the first center and the second center, and the first ROI is smaller than the second ROI, targeting the first ROI as the targeted ROI.

In variations of this embodiment, the method further includes receiving a user configuration input, and selecting, based on the user configuration input, between (i) the features being boundaries of the first ROI and the second ROI and (ii) the features being centers of the first ROI and the second ROI.

In variations of this embodiment, the method further includes highlighting the targeted ROI, targeting a different ROI as the targeted ROI when the pointer is moved around the canvas, and highlighting the different ROI.

In yet another embodiment, a non-transitory machine-readable storage medium stores instructions that, when executed by one or more processors, cause a client computing device to present a first user interface of a machine vision application on a display, the first user interface including a canvas, present a first ROI associated with a first machine vision tool on the canvas, present a second ROI associated with a second machine vision tool on the canvas, target the first ROI or the second ROI as a targeted ROI for interaction based upon (i) distances from a pointer to borders of the first ROI and the second ROI, when a user input satisfies a first criterion, and (ii) distances from the pointer to centers of the first ROI and the second ROI, otherwise, modify the targeted ROI in response to a second user input to form a modified targeted ROI, and configure a machine vision camera to implement the machine vision tool associated with the targeted ROI based on the modified targeted ROI.

In variations of this embodiment, the first criterion is satisfied when the pointer is within a threshold distance of a border of the targeted ROI.

In variations of this embodiment, the instructions, when executed by the one or more processors, cause the client computing device to target the targeted ROI based upon distances from the pointer to centers of the first ROI and the second ROI by (i) when the pointer is over a label for the first ROI, targeting the first ROI as the targeted ROI, (ii) when the pointer is within only the first ROI, targeting the first ROI as the targeted ROI, (iii) when the pointer is within the first ROI and the second ROI, and the pointer is closer to a first center of the first ROI than to a second center of the second ROI, targeting the first ROI as the targeted ROI, and (iv) when the pointer is within the first ROI and the second ROI, the pointer is equidistant to the first center and the second center of the second ROI, and the first ROI is smaller than the second ROI, targeting the first ROI as the targeted ROI.

In variations of this embodiment, the instructions, when executed by the one or more processors, cause the client computing device to target the targeted ROI of the first ROI and the second ROI for interaction based upon distances from the pointer to borders of the first ROI and the second ROI by (i) when the pointer is over a label for the first ROI, targeting the first ROI as the targeted ROI, (ii) when the pointer is within only the first ROI, targeting the first ROI as the targeted ROI, (iii) when the pointer is within the first ROI and the second ROI, and the pointer is closer to a first border of the first ROI than to a second border of the second ROI, targeting the first ROI as the targeted ROI, and (iv) when the pointer is within the first ROI and the second ROI, is equidistant to the first border and to the second border, and is closer to a first center of the first ROI than to a second center of the second ROI, targeting the first ROI as the targeted ROI.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments. The figures depict embodiments of this disclosure for purposes of illustration only. One skilled in the art will readily recognize from the following discussion that alternate embodiments of the systems and methods illustrated herein may be employed without departing from the principles set forth herein.

Figure 1:
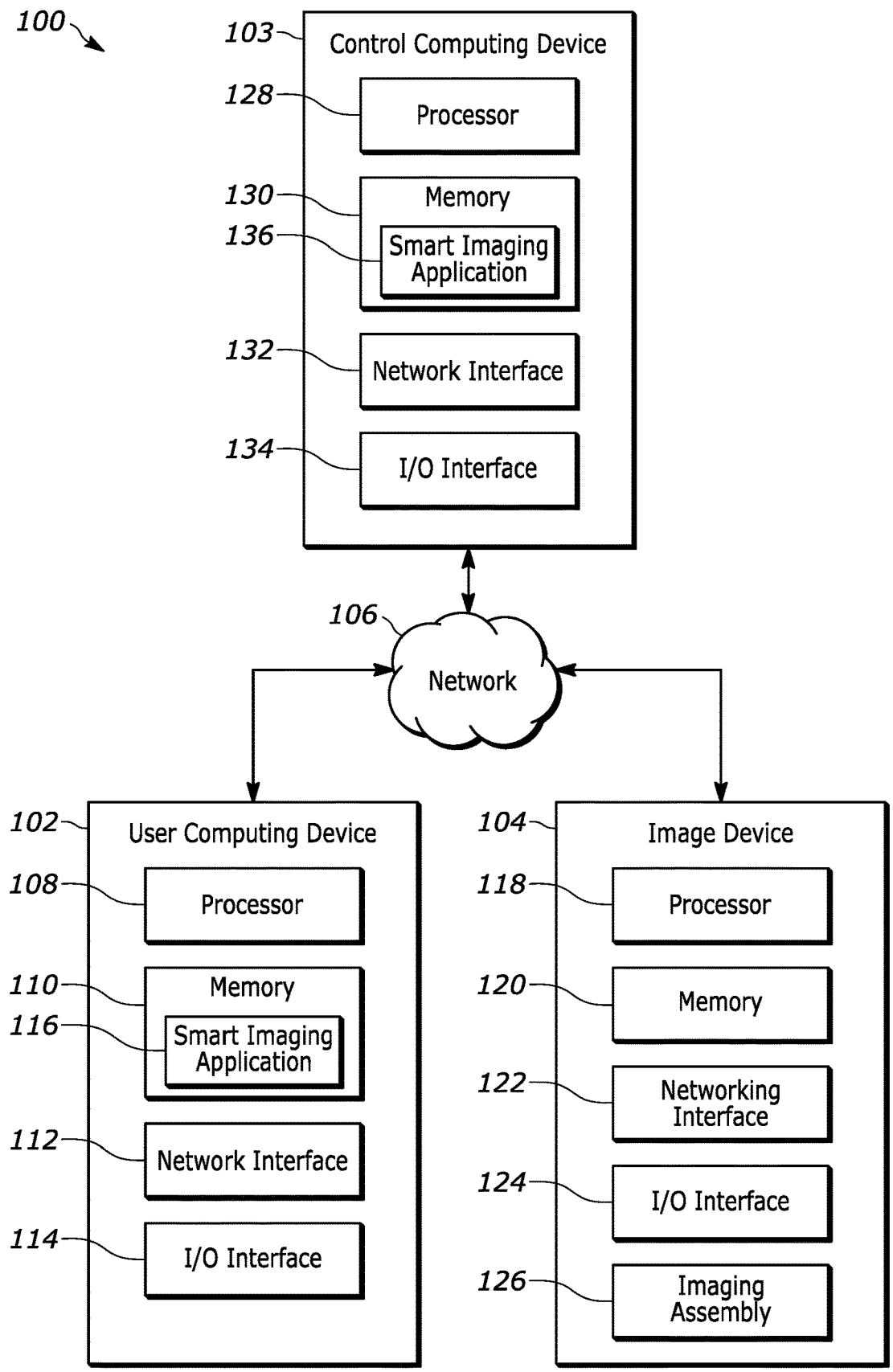
FIG. 1 is an example system for optimizing one or more imaging settings for a machine vision job, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Connecting lines or connectors shown in the various figures presented are intended to represent example functional relationships and/or physical or logical couplings between the various elements.

DETAILED DESCRIPTION

Reference will now be made in detail to non-limiting examples, some of which are illustrated in the accompanying drawings.

Imaging System

FIG. 1 illustrates an example imaging system 100 configured to analyze pixel data of one or more images of a target object to execute a machine vision job, in accordance with various embodiments disclosed herein. In the example embodiment of FIG. 1, the imaging system 100 includes a user computing device 102 (e.g., a computer, mobile device, a tablet, etc.), a control computing device 103 (e.g., a programmable logic controller (PLC), etc.), and an imaging device 104 communicatively coupled to the user computing device 102 and the control computing device 103 via a network 106. Generally speaking, the user computing device 102 and the imaging device 104 may be capable of executing instructions to, for example, implement operations of the example methods described herein, as may be represented by the flowcharts of the drawings that accompany this description. The user computing device 102 is generally configured to enable a user/operator to create a machine vision job for execution on the imaging device 104. When created, the user/operator may then transmit/upload the machine vision job to the imaging device 104 via the network 106, where the machine vision job is then interpreted and executed. Upon the execution of the machine vision job, output data generated by the imaging device 104 can be transmitted to the control computing device 103 for further analysis and use.

The user computing device 102 may comprise one or more operator computers or workstations, and may include one or more processors 108, one or more memories 110, a networking interface 112, an input/output (I/O) interface 114, and a smart imaging application 116.

The imaging device 104 is connected to the user computing device 102 via the network 106 or other communication means (e.g., a universal serial bus (USB) cable, etc.), and is configured to interpret and execute machine vision jobs received from the user computing device 102. Generally, the imaging device 104 may obtain a job file containing one or more job scripts from the user computing device 102 that define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture one or more images of the target object in accordance with the configuration established via the one or more job scripts. Once the image(s) are captured and/or analyzed, the imaging device 104 may transmit the image(s) and any associated data across the network 106 or other communication means (e.g., a USB cable, etc.) to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, a job file may be a JSON representation/data format of the one or more job scripts transferrable from the user computing device 102 to the imaging device 104. The job file may further be loadable/readable by a C++ runtime engine, or other suitable runtime engine, executing on the imaging device 104. Moreover, the imaging device 104 may run a server (not shown) configured to listen for and receive job files across the network 106 or other communication means (e.g., a USB cable, etc.) from the user computing device 102. Additionally or alternatively, the server may be configured to listen for and receive job files may be implemented as one or more cloud-based servers, such as a cloud-based computing platform. For example, the server may be any one or more cloud-based platform(s) such as Microsoft Azure, Amazon Web Services (AWS), or the like.

In any event, the imaging device 104 may include one or more processors 118, one or more memories 120, a networking interface 122, an I/O interface 124, and an imaging assembly 126. The imaging assembly 126 may include a digital camera and/or digital video camera for capturing or taking digital images and/or frames. Each digital image and/or frame may comprise pixel data that may be analyzed by one or more tools each configured to perform an image analysis task. The digital camera and/or digital video camera of, e.g., the imaging assembly 126 may be configured, as disclosed herein, to take, capture, or otherwise generate digital images and, at least in some embodiments, may store such images in a memory (e.g., one or more memories 110, 120) of a respective device (e.g., the user computing device 102, the control computing device 103, the imaging device 104, etc.).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly 126 may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both 2D image data and 3D image data available for a particular target, surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

In embodiments, the imaging assembly 126 may be configured to capture images of surfaces or areas of a predefined search space or target objects within the predefined search space. For example, each tool included in a job script may additionally include a region of interest (ROI) corresponding to a specific region or a target object imaged by the imaging assembly 126. The composite area defined by the ROIs for all tools included in a particular job script may thereby define the predefined search space which the imaging assembly 126 may capture in order to facilitate the execution of the job script. However, the predefined search space may be user-specified to include a field of view (FOV) featuring more or less than the composite area defined by the ROIs of all tools included in the particular job script. It should be noted that the imaging assembly 126 may capture 2D and/or 3D image data/datasets of a variety of areas, such that additional areas in addition to the predefined search spaces are contemplated herein. Moreover, in various embodiments, the imaging assembly 126 may be configured to capture other sets of image data in addition to the 2D/3D image data, such as grayscale image data or amplitude image data, each of which may be depth-aligned with the 2D/3D image data.

The imaging device 104 may also process the 2D image data/datasets and/or 3D image datasets for use by other devices (e.g., the user computing device 102, the control computing device 103, an external server, etc.). For example, the one or more processors 118 may process the image data or datasets captured, scanned, and/or sensed by the imaging assembly 126. The processing of the image data may generate post-imaging data that may include metadata, simplified data, normalized data, result data, status data, and/or alert data as determined from the original scanned and/or sensed image data. The image data and/or the post-imaging data may be sent to the user computing device 102 and/or the control computing device 130 executing the smart imaging application 116, 136 for viewing, manipulation, and/or otherwise interaction. In other embodiments, the image data and/or the post-imaging data may be sent to a server for storage or for further manipulation. As described herein, the user computing device 102, the control computing device 103, the imaging device 104, an external server or other centralized processing unit and/or storage may store such data, and may also send the image data and/or the post-imaging data to another application implemented on a user device, such as a mobile device, a tablet, a handheld device, a desktop device, etc.

The control computing device 130 may include one or more processors 128, one or more memories 130, a networking interface 132, and an I/O interface 134. The control computing device 103 may process image data and/or post-imaging data sensed, captured, processed and/or otherwise generated by the imaging device 104 to, for example, assist operators in a wide variety of tasks, track objects (e.g., moving on a conveyor belt past the imaging device 104), or any other tasks benefiting from or utilizing machine vision.

Example processors 108, 118, 128 include a programmable processor, programmable controller, microcontroller, microprocessor, graphics processing unit (GPU), digital signal processor (DSP), application specific integrated circuit (ASIC), programmable logic device (PLD), field programmable gate array (FPGA), field programmable logic device (FPLD), etc.

Each of the one or more memories 110, 120, 130 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, cache, or any other storage medium, device or disk in which information may be stored for any duration (e.g., permanently, for an extended time period, for a brief instance, for temporarily buffering, for caching of the information, etc.). In general, a computer program or computer based product, application, or code (e.g., a smart imaging application 116, 136 or other computing instructions described herein) may be stored on a computer usable storage medium, or tangible, non-transitory computer-readable medium (e.g., standard RAM, an optical disc, a USB drive, or the like) having such computer-readable program code or computer instructions embodied therein, wherein the computer-readable program code or computer instructions may be installed on or otherwise adapted to be executed by the one or more processors 108, 118, 128 (e.g., working in connection with a respective operating system (OS) in the one or more memories 110, 120, 130) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 120, 130 may store an OS (e.g., Microsoft Windows, Linux, Unix, etc.) capable of facilitating the functionalities, apps, methods, or other software as discussed herein. The one or more memories 110, 130 may also store the smart imaging application 116, 136, which may be configured to enable machine vision job construction, as described further herein. Additionally and/or alternatively, the smart imaging application 116, 136 may also be stored in the one or more memories 120 of the imaging device 104, and/or in an external database (not shown), which is accessible or otherwise communicatively coupled to the user computing device 102 via the network 106 or other communication means. The one or more memories 110, 120, 130 may also store machine readable instructions, including any of one or more application(s), one or more software component(s), one or more user interface (UIs), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, UIs or APIs may be, include, otherwise be part of, a machine vision based imaging application, such as the smart imaging application 116, 136, where each may be configured to facilitate their various functionalities discussed herein. It should be appreciated that one or more other applications may be envisioned and executed by the one or more processors 108, 118, 128.

The one or more processors 108, 118, 128 may be connected to the one or more memories 110, 120, 130 via a computer bus (not shown for clarity of illustration) responsible for transmitting electronic data, data packets, or otherwise electronic signals to and from the one or more processors 108, 118, 128 and the one or more memories 110, 120, 130 in order to implement or perform the machine readable instructions, methods, processes, elements or limitations, as illustrated, depicted, or described for the various flowcharts, illustrations, diagrams, figures, and/or other disclosure herein.

The one or more processors 108, 118, 128 may interface with the one or more memories 110, 120 via the computer bus to execute the OS. The one or more processors 108, 118, 128 may also interface with the one or more memories 110, 120, 130 via the computer bus to create, read, update, delete, or otherwise access or interact with the data stored in the one or more memories 110, 120, 130 and/or external databases (e.g., a relational database such as Oracle, DB2, MySQL, or a NoSQL based database such as MongoDB). The data stored in the one or more memories 110, 120, 130 and/or an external database may include all or part of any of the data or information described herein, including, for example, machine vision job images (e.g., images captured by the imaging device 104 in response to execution of a job script) and/or other suitable information.

The networking interfaces 112, 122, 132 may be configured to communicate (e.g., send and receive) data via one or more external/network port(s) to one or more networks or local terminals, such as the network 106, described herein. In some embodiments, networking interfaces 112, 122, 132 may include a client-server platform technology such as ASP.NET, Java J2EE, Ruby on Rails, Node.js, a web service or online API, responsive for receiving and responding to electronic requests. The networking interfaces 112, 122, 132 may implement the client-server platform technology that may interact, via the computer bus, with the one or more memories 110, 120, 130 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122, 132 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, the network 106 may comprise a private network or local area network (LAN). Additionally and/or alternatively, the network 106 may comprise a public network such as the Internet. In some embodiments, the network 106 may comprise routers, wireless switches, or other such wireless connection points communicating to the user computing device 102 (via the networking interface 112), the control computing device 103 (via the network interface 132) and the imaging device 104 (via networking interface 122) via wireless communications based on any one or more of various wireless standards, including by non-limiting example, IEEE 802.11a/b/c/g (WiFi®), the Bluetooth® standard, nearfield communication (NFC), 3G, 4G, 5G, or the like.

The I/O interfaces 114, 124, 134 may include or implement operator interfaces configured to present information to an administrator or user/operator and/or receive inputs from the administrator or user/operator. An operator interface may provide a display screen (e.g., via the user computing device 102, the control computing device 103 and/or imaging device 104) which a user/operator may use to visualize any images, graphics, text, data, features, pixels, and/or other suitable visualizations or information. For example, the user computing device 102, the control computing device 103 and/or the imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interfaces 114, 124, 134 may also include I/O components (e.g., ports, capacitive or resistive touch sensitive input panels, keys, buttons, lights, light emitting diodes (LEDs), any number of keyboards, mice, USB drives, optical drives, screens, touchscreens, printers, etc.), which may be directly/indirectly accessible via or attached to the user computing device 102, the control computing device 130 and/or the imaging device 104. According to some embodiments, an administrator or user/operator may access the user computing device 102, the control computing device 103 and/or the imaging device 104 to construct jobs, review images or other information, make changes, input responses and/or selections, and/or perform other functions.

As described above herein, in some embodiments, the user computing device 102 and/or the control computing device 130 may perform the functionalities as discussed herein as part of a "cloud" network or may otherwise communicate with other hardware or software components within the cloud to send, retrieve, or otherwise analyze data or information described herein.

While example manners of implementing the user computing device 102, the control computing device 103 and the imaging device 104 are illustrated in FIG. 1, one or more of the structures and/or methods illustrated in FIG. 1 may be combined, divided, re-arranged, omitted, eliminated and/or implemented in any other way. Further still, the user computing device 102, the control computing device 103 and the imaging device 104 may include one or more structures or methods in addition to, or instead of, those illustrated in FIG. 1, and/or may include more than one of any or all of the illustrated structures and methods.

Imaging Device

Figure 2:
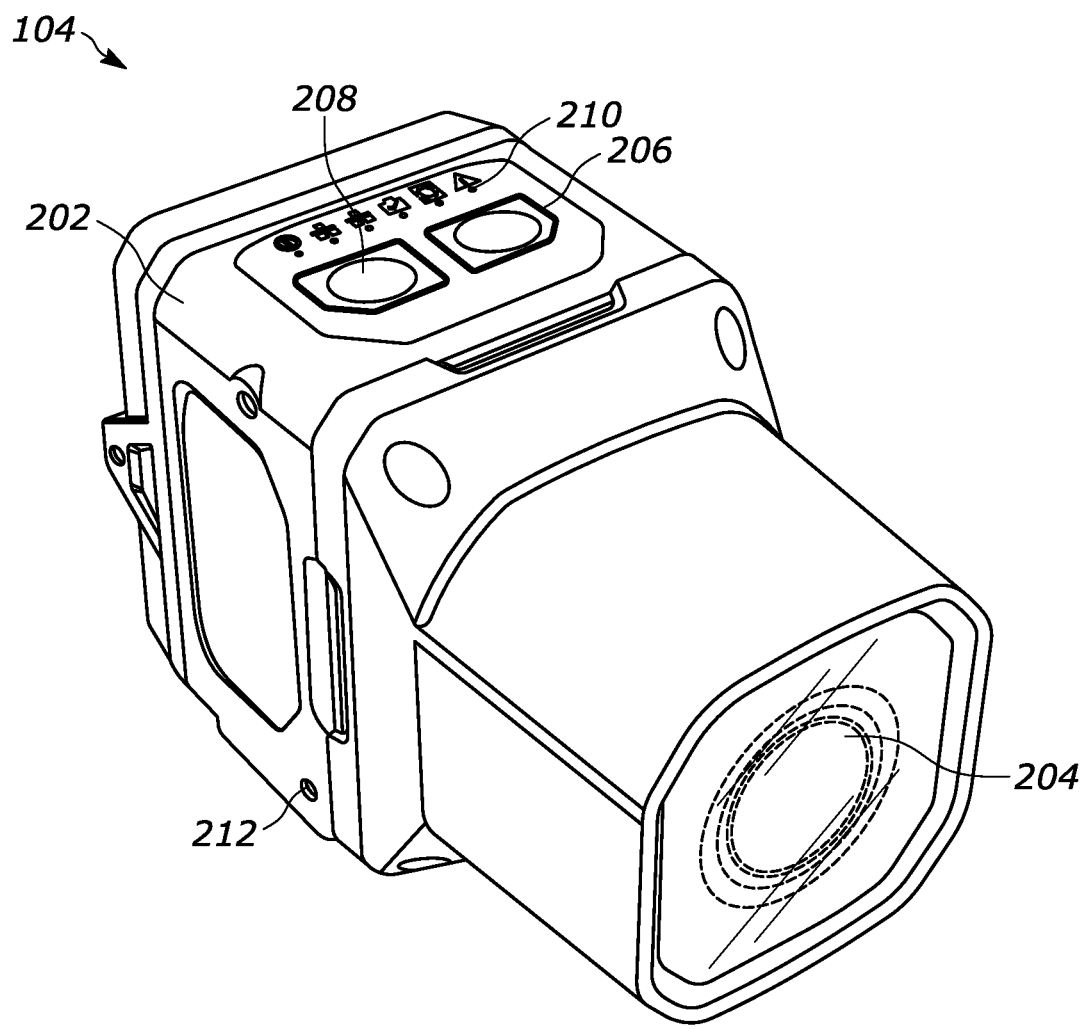
FIG. 2 is a perspective view of the imaging device of FIG. 1, in accordance with embodiments described herein.

FIG. 2 is a perspective view of the imaging device 104 of FIG. 1, in accordance with embodiments described herein. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may obtain job files from a user computing device (e.g., the user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via the one or more processors 118) and accordingly increase the aperture size of the imaging aperture 204. Thus, the imaging device 104 may be configured to automatically adjust its own configuration to optimally conform to a particular machine vision job. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and the one or more LEDs 210, and may thereby enable a variety of interactive and/or indicative features. Generally, the user interface label 206 may enable a user/operator to trigger and/or tune the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., the dome/switch button 208) may enable a user/operator to capture an image using the imaging device 104 and/or to display a trigger configuration screen of a user application (e.g., the smart imaging application 116). The trigger configuration screen may allow the user/operator to configure one or more triggers for the imaging device 104 that may be stored in memory (e.g., the one or more memories 120) for use in later developed machine vision jobs, as discussed herein.

As another example, the tuning function of a dome switch/button (e.g., the dome/switch button 208) may enable a user/operator to automatically and/or manually adjust the configuration of the imaging device 104 in accordance with a preferred/predetermined configuration and/or to display an imaging configuration screen of a user application (e.g., the smart imaging application 116). The imaging configuration screen may allow the user/operator to configure one or more configurations of the imaging device 104 (e.g., aperture size, exposure length, etc.) that may be stored in memory (e.g., the one or more memories 120) for use in later developed machine vision jobs, as discussed herein.

To further this example, and as discussed further herein, a user/operator may utilize the imaging configuration screen (or more generally, the smart imaging application 116) to establish two or more configurations of imaging settings for the imaging device 104. The user/operator may then save these two or more configurations of imaging settings as part of a machine vision job that is then transmitted to the imaging device 104 in a job file containing one or more job scripts. The one or more job scripts may then instruct the imaging device 104 processors (e.g., the one or more processors 118) to automatically and sequentially adjust the imaging settings of the imaging device 104 in accordance with one or more of the two or more configurations of imaging settings after each successive image capture.

The mounting point(s) 212 may enable a person to connect and/or removably affix the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a person to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., the network 106). For example, the imaging device 104 may include a networking interface (e.g., the networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, NFC, Bluetooth, RS-232, and/or any other suitable communication protocol or combinations thereof.

Machine Vision Application

Figure 3:
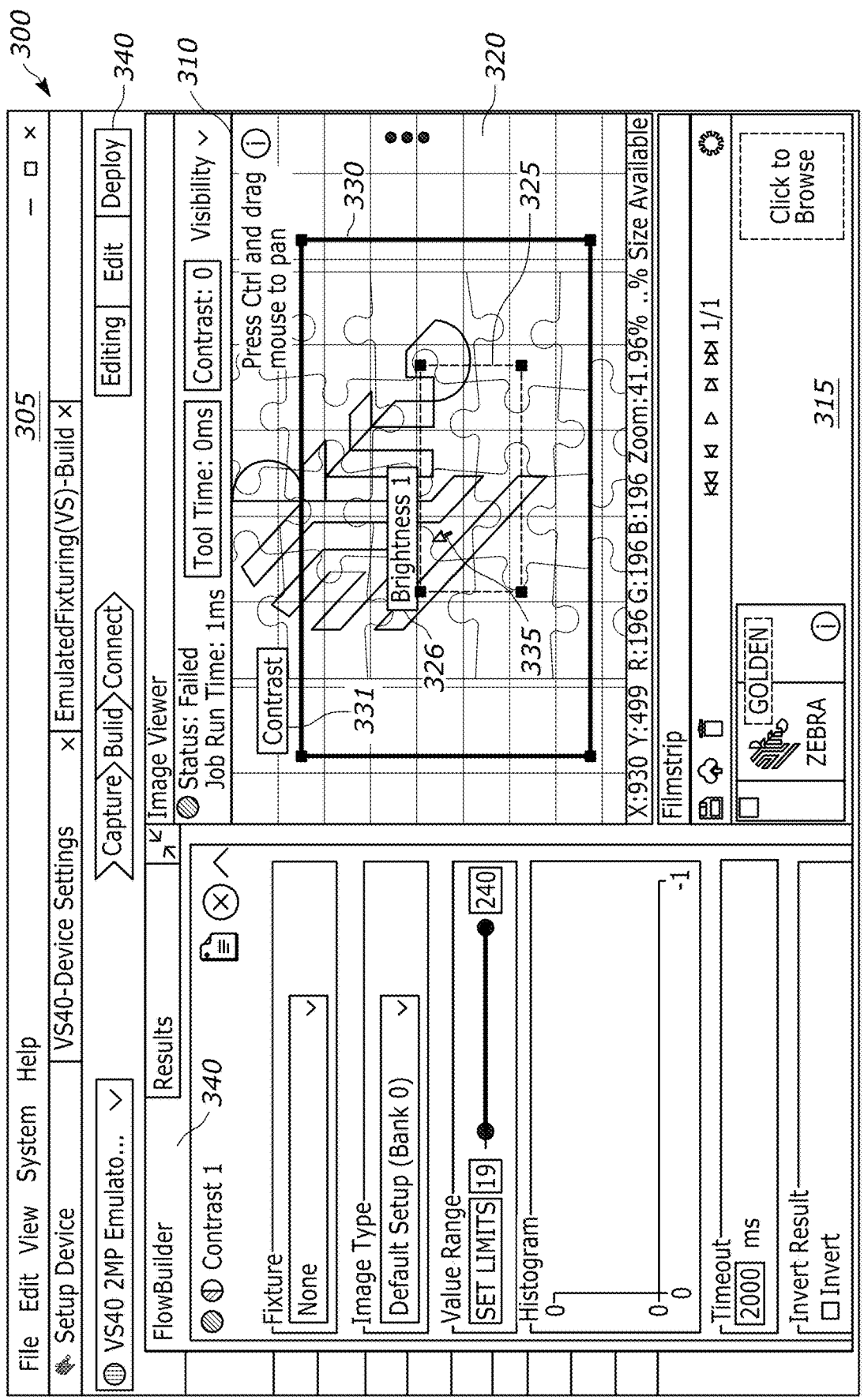
FIG. 3 depicts example application interface utilized in connection with the operation of a machine vision system.

FIG. 3 depicts an example machine vision application 300 (e.g., the smart imaging application 116, 136) that may be utilized in connection with the control, configuration, operation, etc. of a machine vision system (e.g., the imaging device 104, etc.). The example machine vision application 300 includes a user interface 305 having a canvas 310. The canvas 310 may be a graphical working area for displaying, presenting, interacting with, manipulating, etc. digital images (e.g., selected from a filmstrip 315) and regions of interest (ROIs). The images may be received from a machine vision system (e.g., the imaging device 104) and/or from a datastore of images. In the illustrated example of FIG. 3, the canvas 310 is presenting an example image 320 and two overlapping ROIs 325 and 330.

It should be appreciated that an ROI may be any desirable shape and may be obtained in any way, be it manual or automatic. For example, while each illustrated ROI 325, 330 is shown as having a rectangular shape, an ROI may have, for example, a circular, square, ellipsoidal, octagonal, or any other desired shape. Additionally, an ROI does not have to be symmetrical about any line and an ROI may have an all-together irregular shape. With respect to generating an ROI, it may be generated manually by selecting a point in the image 320 with a mouse and dragging a mouse pointer 335 from that point while activating the ROI function to draw an ROI of desired proportions, or it may be generated based on the results of image analysis performed by the machine vision application 300 and/or the imaging device 104. For instance, the user computing system 102 may be configured to generate an ROI around an area within an image having a pixel brightness value above or below a threshold, it may be configured to generate an ROI based on edge detection, it may be configured to generate an ROI based on color detection, and so on. Additionally, each ROI may have a label 325, 331 presented on the canvas 310, providing some identifying information which, in some embodiments, is representative of the approach that was used to generate the ROI and/or an associated machine vision tool. In embodiments, each ROI 325, 330 has a transparent body so ROIs can be seen even when overlapping, stacked, etc.

In general, a machine vision job may be created, edited, etc. by defining one or more ROIs and configuring their associated machine vision tools. When an ROI (e.g., the contrast ROI 330) is selected, the machine vision application 300 presents a tool-configuration user interface 340 that enables a user/operator to configure a machine vision tool (e.g., a contrast adjusting tool) associated with the selected ROI. Once the machine vision job has been thus defined, the machine vision application 300 may deploy the machine vision job to a machine vision system (e.g., the imaging device 104, etc.), for example, as described above in connection with FIGS. 1 and 2, when an user/operator activates, presses, selects, etc. a "deploy" user interface feature 340.

Region of Interest (ROI) Targeting

When multiple ROIs are present, the machine vision application 300 may implement disclosed logic that allows a user to intuitively target, select, etc. a particular ROI for interaction.

Figure 4:
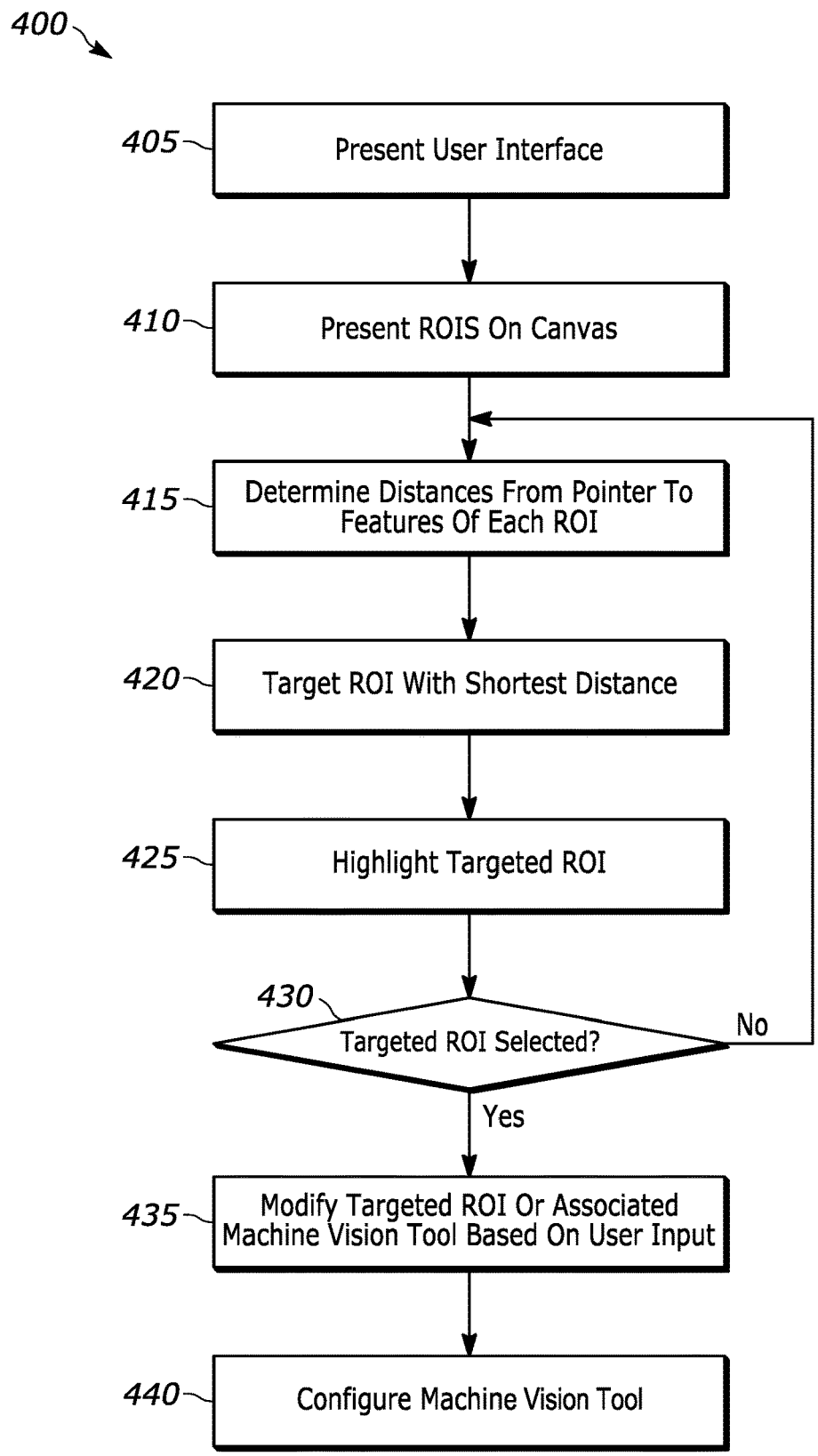
FIG. 4 is a flowchart representative of an example method, hardware logic, machine-readable instructions, or software for implementing the example user computing device of FIG. 1, in accordance with disclosed embodiments.

FIG. 4 is a flowchart 400 representative of example processes, methods, software, machine-readable instructions, etc. that may be carried out to identify a target ROI that a user/operator intends, desires, wants, etc. to interact with and to configure a machine vision job based on targeted ROIs.

The program 400 of FIG. 4 begins at block 405 with a user interface of a machine vision application (e.g., the user interface 305 of the machine vision application 300) being presented on a display. One or more ROIs are presented on a canvas of the user interface (e.g., the ROIs 325 and 330 are presented on the canvas 310) (block 410). Distances from a mouse pointer (e.g., the pointer 335) to features of each ROI are determined (block 415). Example features of the ROIs include labels of the ROIs (e.g., the labels 326 and 331), borders of the ROIs, centers of the ROIs, etc. The ROI having the shortest distance from the mouse pointer to one of its features is targeted as a targeted ROI for interaction, i.e., which ROI should be affected in response to a user action (block 420). Example distance determinations and ROI targeting are described below in connection with FIGS. 5-15. In embodiments, the targeted ROI is highlighted by changing the color of its transparent body, the color or boldness of its border, etc. (block 425) so the user/operator knows with which ROI they would be interacting given the current mouse pointer position. Until the targeted ROI is selected (e.g., by a user/operator clicking their mouse) (block 430), determination of distances at block 415, the targeting of an ROI for interaction at block 420, and the highlighting at block 425 may be repeated as the mouse pointer is moved around the canvas.

When the targeted ROI is selected (block 430), the targeted ROI may be modified in response to user inputs (e.g., in response to a user/operator using their mouse to move and/or resize the targeted ROI) and/or the machine vision tool associated with the targeted ROI may be configured using a tool-configuration user interface (e.g., the user interface 340) (block 435). The thus configured machine vision job is deployed to a machine vision system (e.g., the imaging device 104, etc.), for example, as described above in connection with FIGS. 1 and 2, when the user/operator activates, presses, selects, etc. the "deploy" user interface feature 340 (block 440).

Border-Distance ROI Targeting

Figure 5:
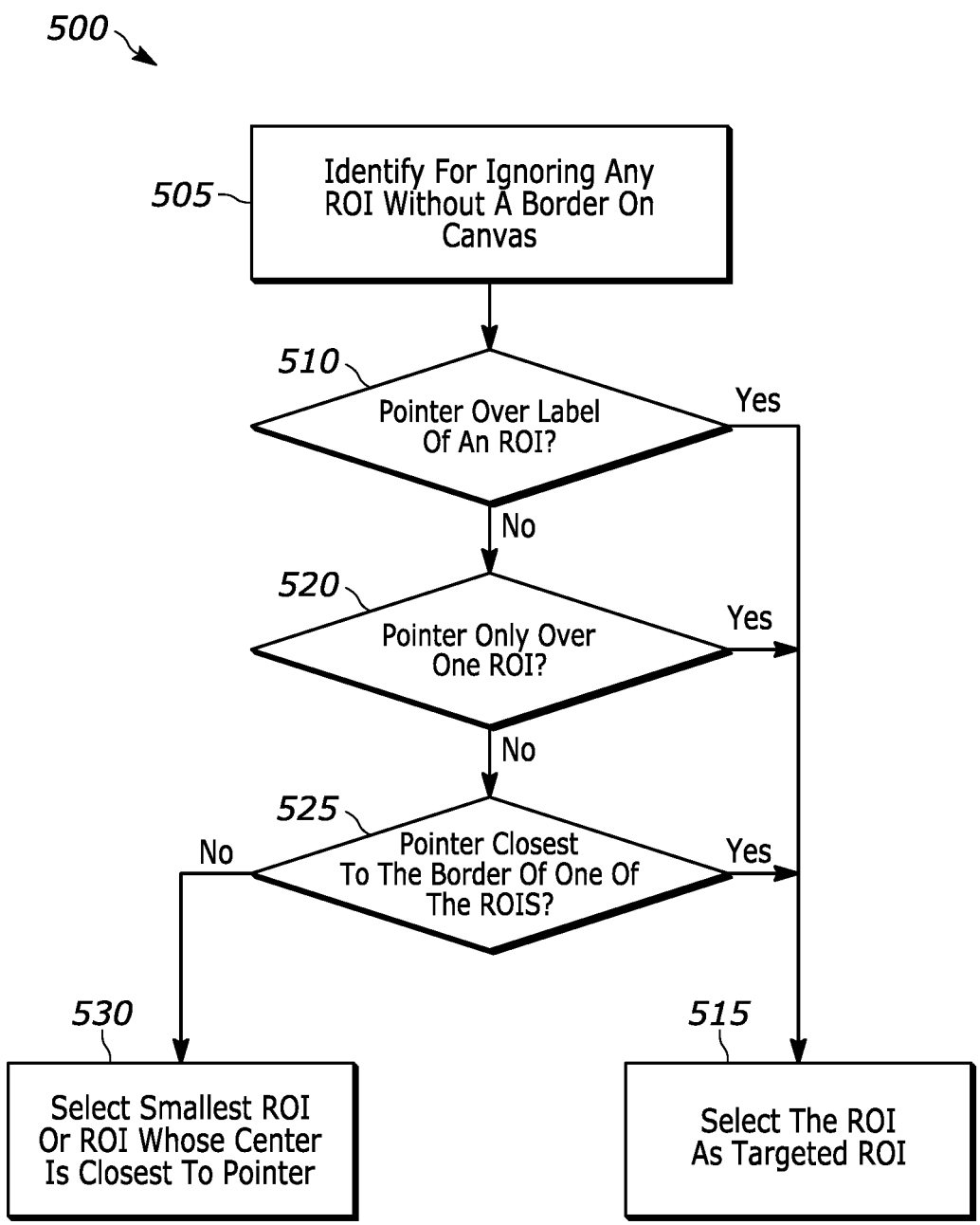
FIG. 5 is a flowchart representative of an example method, hardware logic, machine-readable instructions, or software for targeting an ROI for interaction based on distances to borders of ROIs, in accordance with disclosed embodiments.
Figure 6:
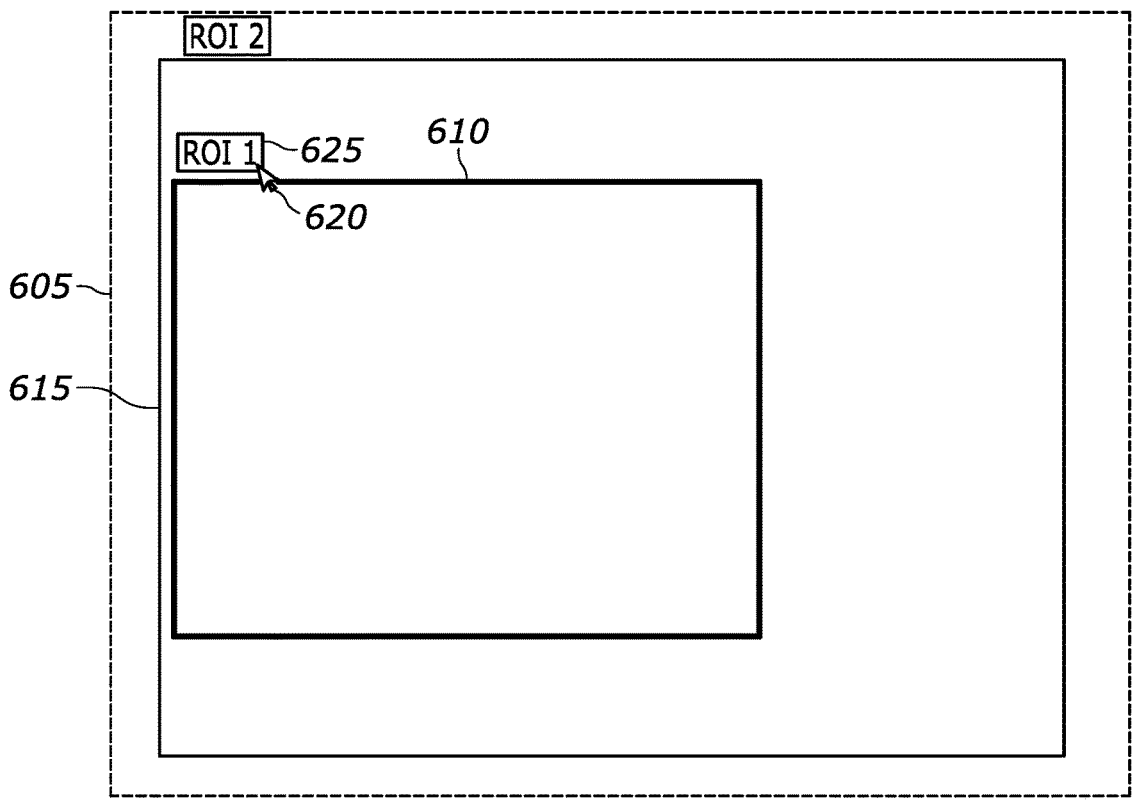
FIGS. 6, 7, 8 and 9 illustrate examples of targeting ROIs for interaction based on borders of ROIs.
Figure 7:
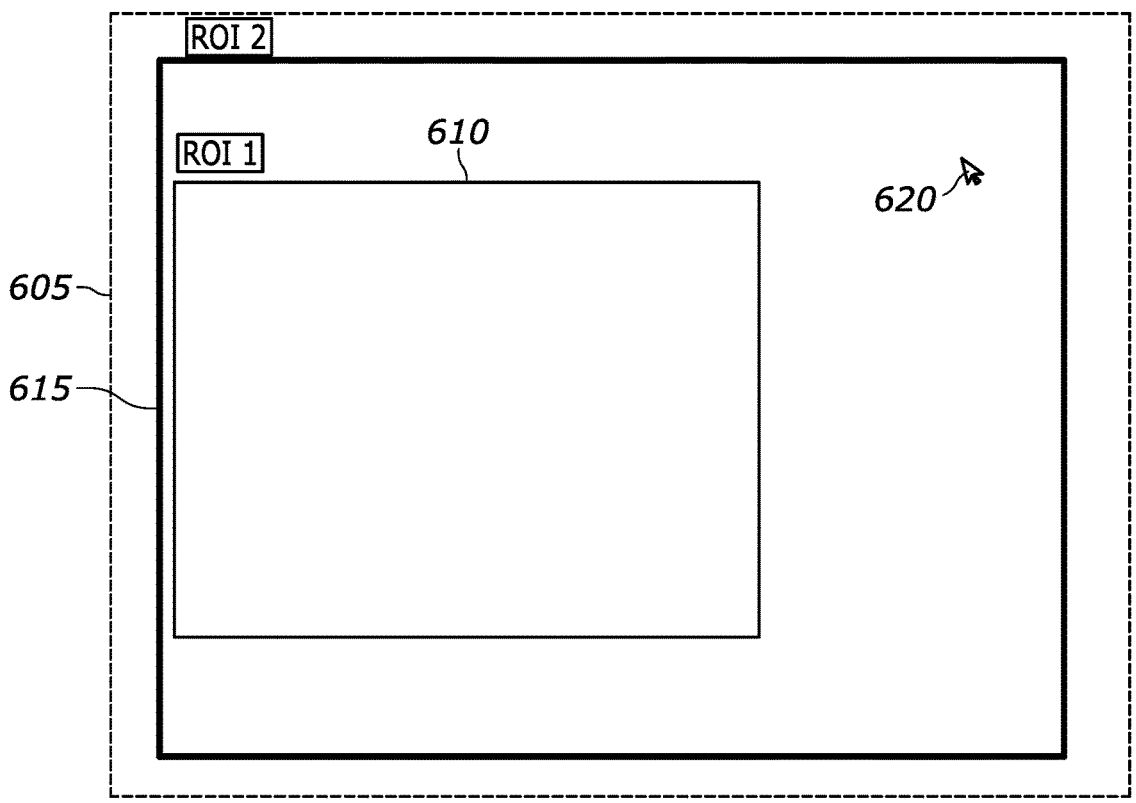
Figure 8:
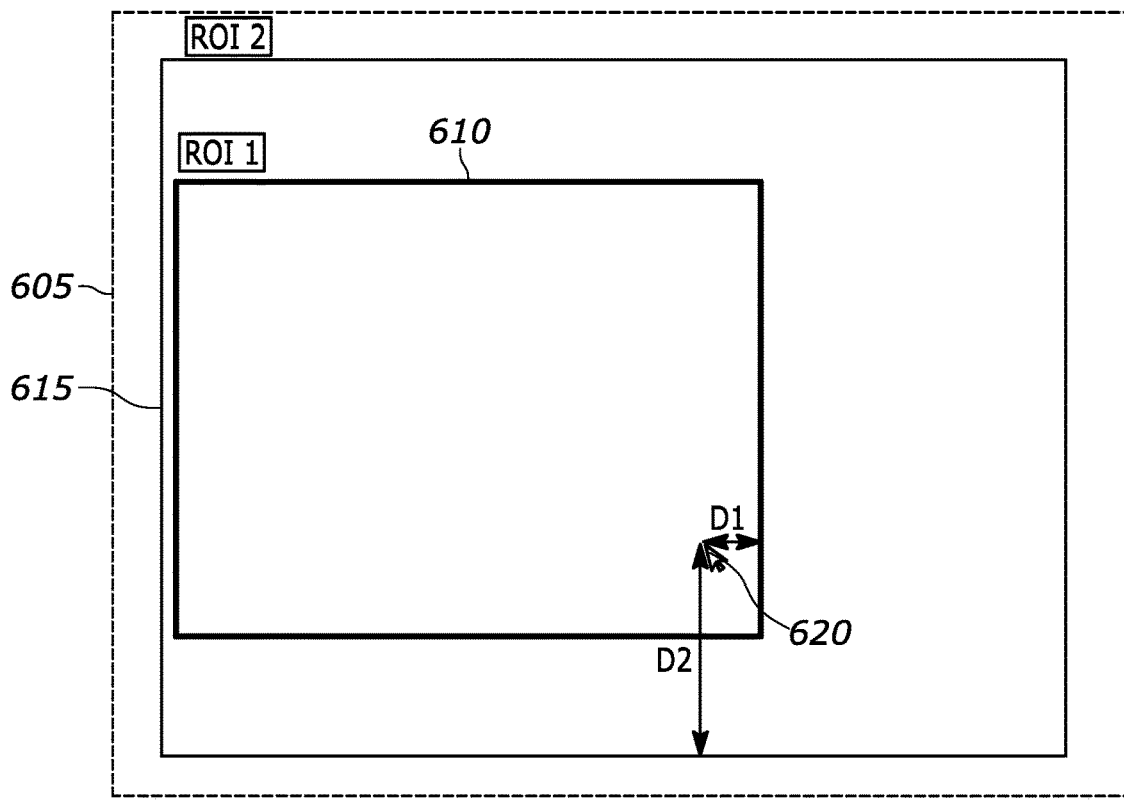
Figure 9:
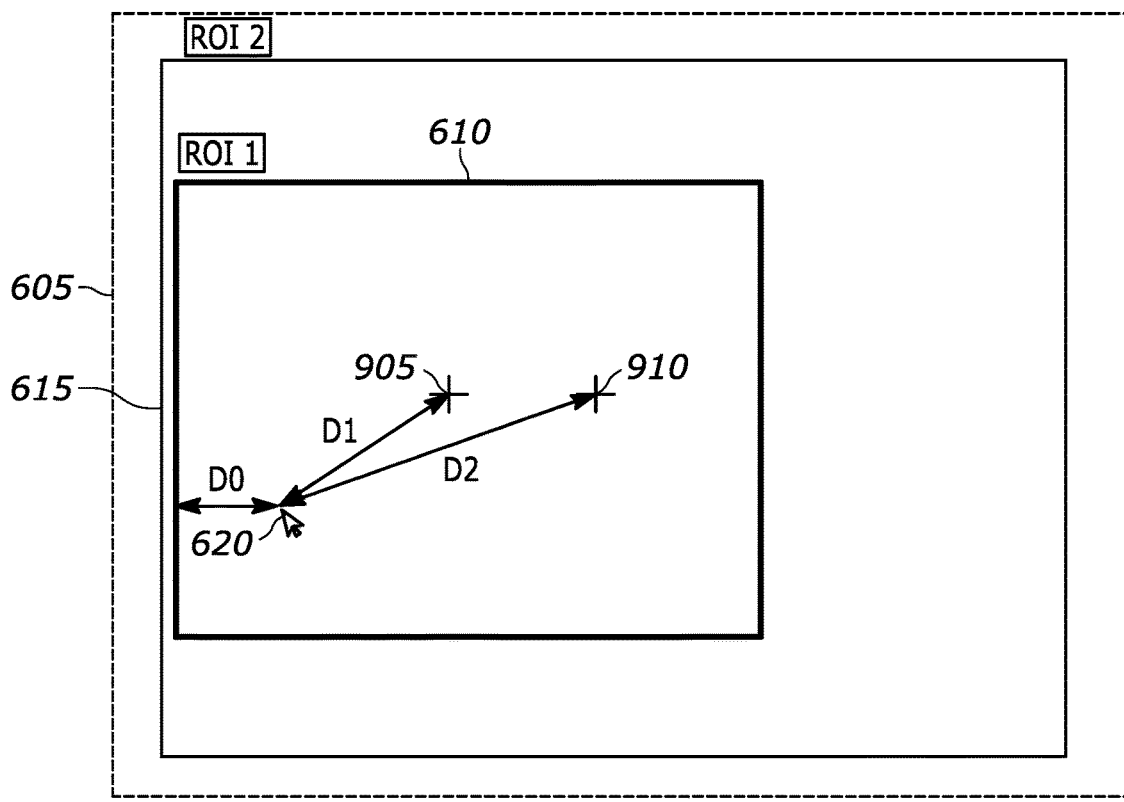

FIG. 5 is a flowchart 500 representative of example processes, methods, software, machine-readable instructions, etc. that may be carried out to identify a target ROI that a user/operator intends, desires, wants, etc. to interact with based on distances from a mouse pointer to borders of ROIs. The border of an ROI can be a visible element of an otherwise transparent ROI body, so it can serve as a better anchor for targeting than an invisible center. According to embodiments, even though the thin border would likely require too much pointing accuracy to serve as a target by itself, users/operators can follow the convention of pointing to the inside of an ROI body near its border, which is easy because it requires less pointing accuracy. It is also intuitive and easier for new users/operators to grasp. Border-distance targeting may be better than targeting the smallest ROI because the canvas could be zoomed near the border of the larger ROI such that the smaller ROI is not visible. A user/operator may expect that only ROIs with a border visible on the canvas would be targeted, which happens with the border-distance logic of FIG. 5. Border-distance targeting may also be an improvement over the center-distance targeting described below in connection with FIG. 10. For example, in FIG. 3 even though the mouse pointer 335 is closer to the center of the larger ROI 330, the expectation may be that the inner ROI 325 is targeted. If the user/operator had wanted to target the outer ROI 330, there are plenty of other places they could have positioned the mouse pointer instead. Center-distance targeting would target the outer ROI 330 and the border-distance targeting of FIG. 5 would target the inner ROI 325 in this scenario.

The program of FIG. 5 will be described in connection with examples shown in FIGS. 6-9. The examples of FIGS. 6-9 include a canvas 605 on which a first ROI 610 and a second ROI 615 are presented. As a mouse pointer 620 is moved about the canvas 605, as shown in FIGS. 6-9, either the first ROI 610 or the second ROI 615 is identified as a targeted ROI in accordance with the example border-distance logic of FIG. 5.

The program of FIG. 5 begins at block 505 with any ROIs not having at least one border displayed on a canvas being marked for ignoring, that is, not available to be targeted (block 505). Such circumstances may arise, for example, when a user/operator has zoomed in on the canvas. The ignoring of such ROIs prevents an un-displayed ROI, which a user may not even be aware of, from being un-intuitively targeted, thus, decreasing user frustration with how ROIs are targeted for interaction.

If a mouse pointer is over an ROI label (block 510), the ROI associated with the ROI label is targeted as a targeted ROI for interaction (block 515). For example, in FIG. 6 the mouse pointer 620 is over an ROI label 625 of the first ROI 610 and, thus, the first ROI 610 is targeted for interaction and is highlighted.

Otherwise, if the mouse pointer is within the body of only a single ROI (block 520), the ROI within which the mouse pointer is found is targeted as a targeted ROI for interaction (block 515). For example, in FIG. 7 the mouse pointer 620 is only within the second ROI 615 and, thus, the second ROI 615 is targeted for interaction and is highlighted.

Otherwise, if the mouse pointer is within the body of multiple ROIs (block 520), and the mouse pointer is closest to the border of one of the ROIs (block 525), the ROI with the border closest to the mouse pointer is targeted as a targeted ROI for interaction (block 515). For example, in FIG. 8 the mouse pointer 620 is a distance D1 from the closest border of the first ROI 610 and a distance D2 from the closest border of the second ROI 615. Because the distance D1 is smaller than the distance D2, the first ROI 610 is targeted for interaction and is highlighted.

Otherwise, if the mouse pointer is equidistant to the border of two ROIs (block 525), the ROI that is smallest and/or whose center is closest to the mouse pointer is targeted as a targeted ROI for interaction (block 530). For example, in FIG. 9 the mouse pointer 620 is a distance D0 from the borders of the first ROI 610 and the second ROI 615. The mouse pointer 620 is a distance D1 from the center 905 of the first ROI 610 and a distance D2 from the center 910 of the second ROI 615. Because the distance D1 is smaller than the distance D2, the first ROI 610 is targeted for interaction and is highlighted.

Center-Distance ROI Targeting

Figure 10:
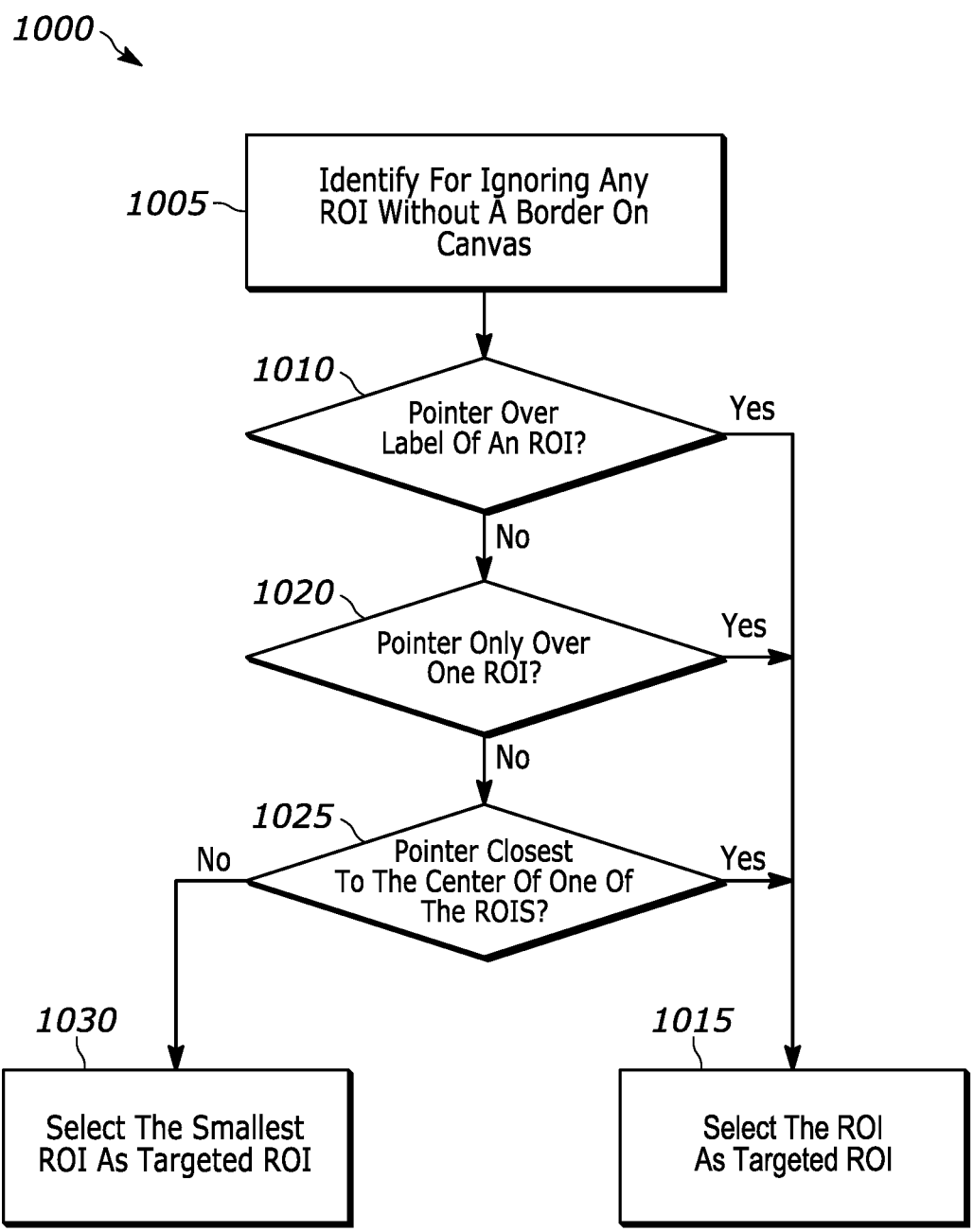
FIG. 10 is a flowchart representative of an example method, hardware logic, machine-readable instructions, or software for targeting an ROI for interaction based on distances to centers of ROIs, in accordance with disclosed embodiments.
Figure 11:
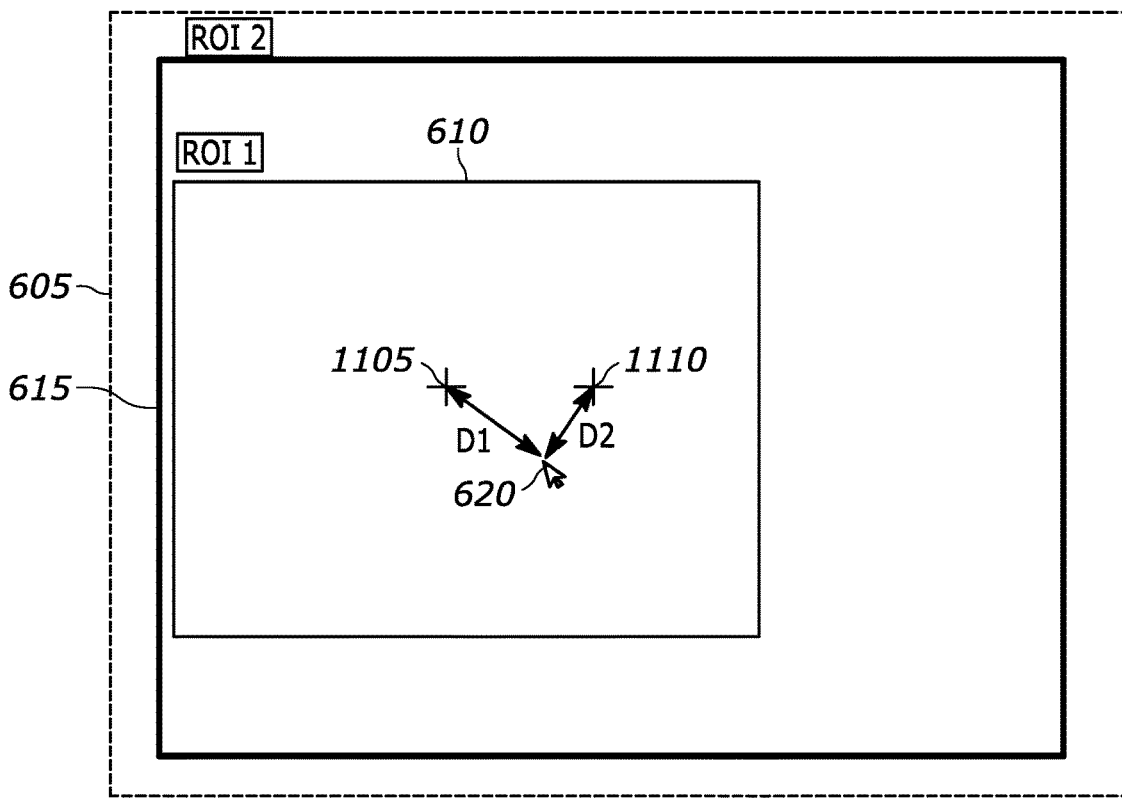
FIGS. 11 and 12 illustrate additional examples of targeting ROIs for interaction based on centers of ROIs.
Figure 12:
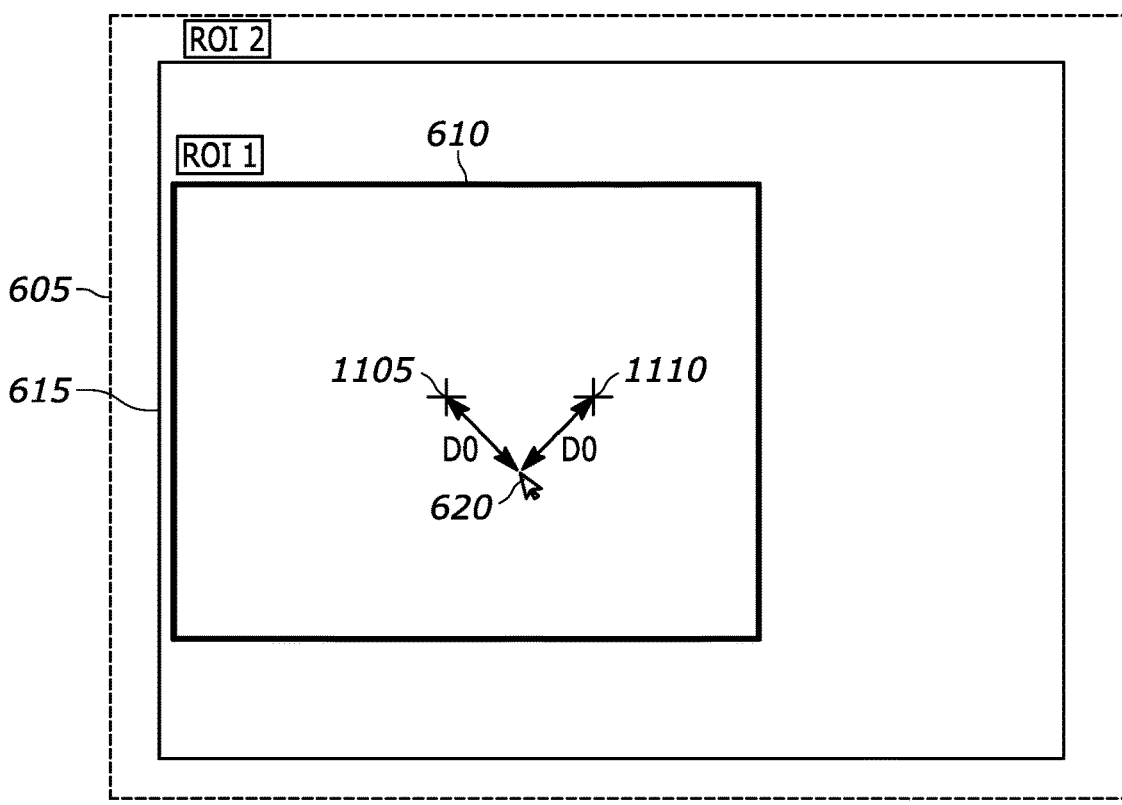

FIG. 10 is a flowchart 1000 representative of example processes, methods, software, machine-readable instructions, etc. that may be carried out to identify a target ROI that a user/operator intends, desires, wants, etc. to interact with based on distances from a mouse pointer to centers of ROIs. While possibly not as intuitive as border-distance logic, center-distance logic works well and, in many scenarios, it also allows users/operators to easily target a desired ROI out of a group of overlapping ROIs.

The program of FIG. 10 will be described in connection with examples shown in FIGS. 6, 7, 11 and 12. The examples of FIGS. 6, 7, 11 and 12 include the canvas 605 on which the first ROI 610 and the second ROI 615 are presented. As the mouse pointer 620 is moved about the canvas 605, as shown in FIGS. 6, 7, 11 and 12, either the first ROI 610 or the second ROI 615 is identified as a targeted ROI in accordance with the example logic of FIG. 10.

The program of FIG. 10 begins at block 1005 with any ROIs not having at least one border displayed on a canvas being marked for ignoring, that is, not available to be targeted (block 1005).

If a mouse pointer is over an ROI label (block 1010), the ROI associated with the ROI label is targeted as a targeted ROI for interaction (block 1015). For example, in FIG. 6 the mouse pointer 620 is over an ROI label 625 of the first ROI 610 and, thus, the first ROI 610 is targeted for interaction and is highlighted.

Otherwise, if the mouse pointer is within the body of only a single ROI (block 1020), the ROI within which the mouse pointer is found is targeted as a targeted ROI for interaction (block 1015). For example, in FIG. 7 the mouse pointer 620 is only within the second ROI 615 and, thus, the second ROI 615 is targeted for interaction and is highlighted.

Otherwise, if the mouse pointer is within the body of multiple ROIs (block 1020), and the mouse pointer is closest to the center of one of the ROIs (block 1025), the ROI with the center closest to the mouse pointer is targeted as a targeted ROI for interaction (block 1015). For example, in FIG. 11 the mouse pointer 620 is a distance D1 from the center 1105 of the first ROI 610 and a distance D2 from the center 1110 of the second ROI 615. Because the distance D2 is smaller than the distance D1, the second ROI 615 is targeted for interaction and is highlighted.

Otherwise, if the mouse pointer is equidistant to the centers of two ROIs (block 1025), the ROI that is smallest is targeted as a targeted ROI for interaction (block 1030). For example, in FIG. 12 the mouse pointer 620 is the same distance D0 from the center 1105 of the first ROI 610 and the center 1110 of the second ROI 615. Because the first ROI 610 is smaller, the first ROI 610 is targeted for interaction and is highlighted.

Dynamic Border-Distance and Center-Distance Targeting

Figure 13:
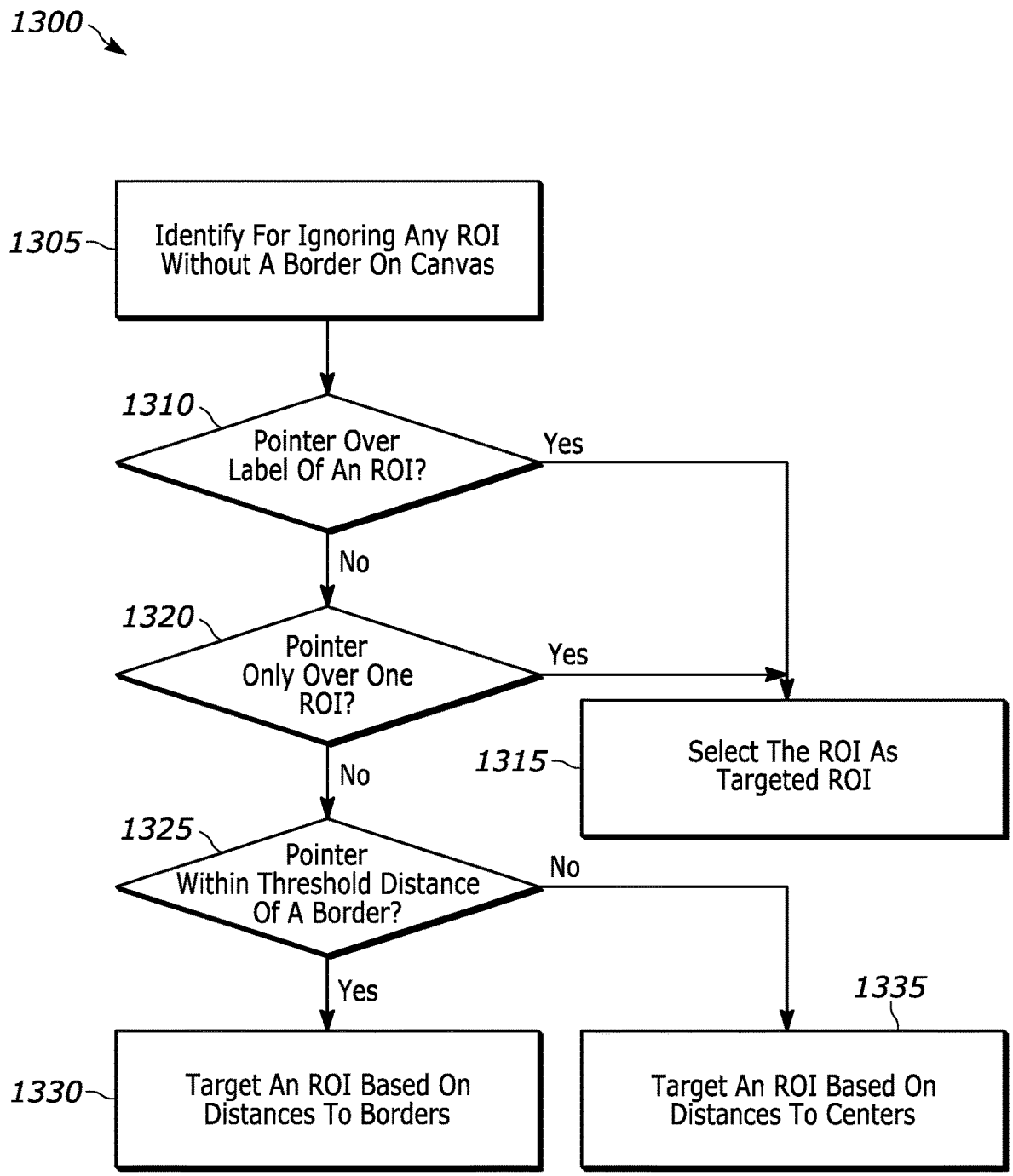
FIG. 13 is a flowchart representative of an example method, hardware logic, machine-readable instructions, or software for targeting an ROI for interaction based on distances to centers and borders of ROIs, in accordance with disclosed embodiments.
Figure 14:
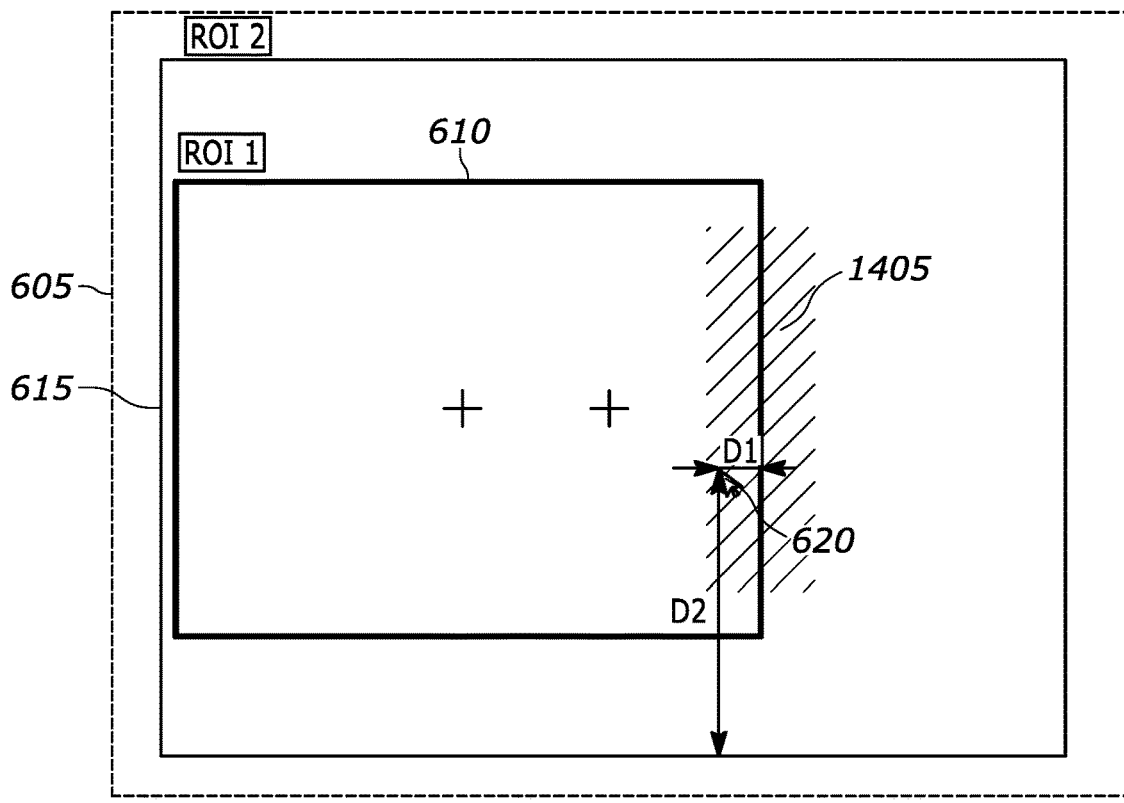
FIGS. 14 and 15 illustrate further examples of targeting ROIs for interaction based on borders and centers of ROIs.
Figure 15:
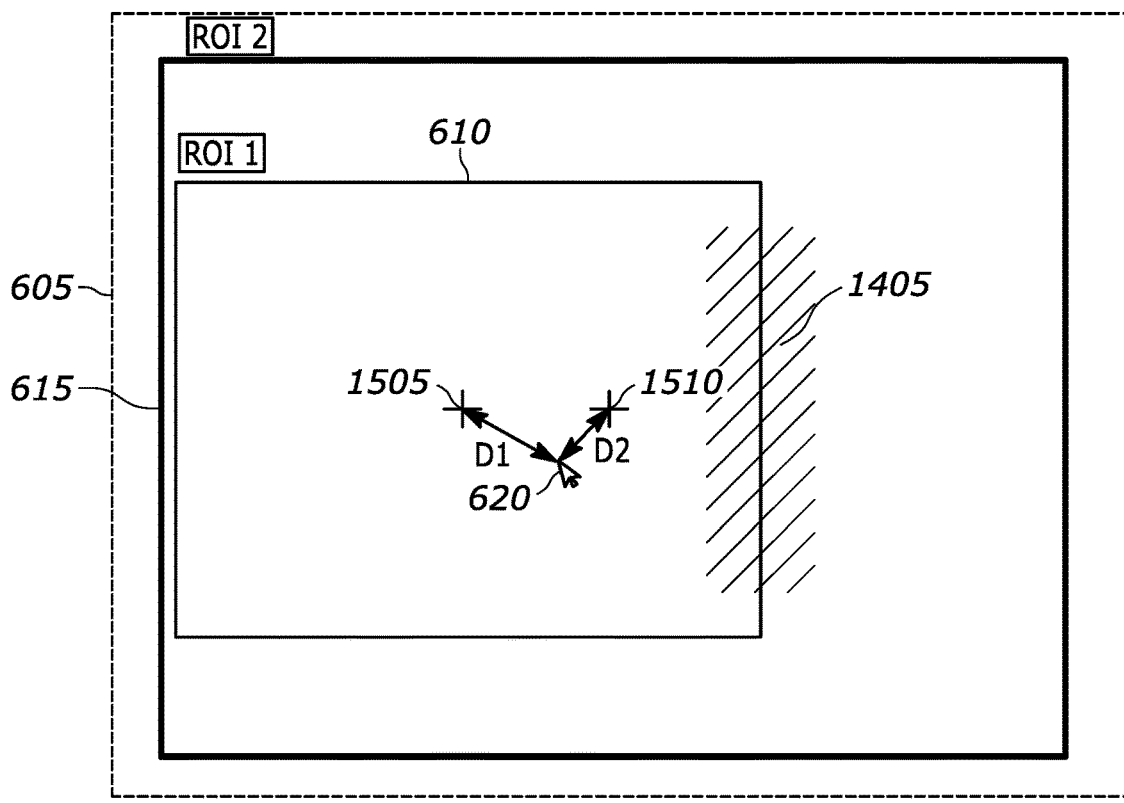

FIG. 13 is a flowchart 1300 representative of example processes, methods, software, machine-readable instructions, etc. that may be carried out to identify a target ROI that a user/operator intends, desires, wants, etc. to interact with based on distances from a mouse pointer to borders and centers of ROIs. The program of FIG. 13 dynamically switches between border-distance targeting (FIG. 5) and center-distance targeting (FIG. 10). Center-distance targeting would be used unless a user input satisfies a criterion. For example, border-distance targeting is used when the mouse pointer is within some distance threshold of a border.

The program of FIG. 13 will be described in connection with examples shown in FIGS. 6, 7, 14 and 15. The examples of FIGS. 6, 7, 14 and 15 include the canvas 605 on which the first ROI 610 and the second ROI 615 are presented. As the mouse pointer 620 is moved about the canvas 605, as shown in FIGS. 6, 7, 14 and 15, either the first ROI 610 or the second ROI 615 is identified as a targeted ROI in accordance with the example logic of FIG. 13.

The program of FIG. 13 begins at block 1305 with any ROIs not having at least one border displayed on a canvas being marked for ignoring, that is, not available to be targeted (block 1305).

If a mouse pointer is over an ROI label (block 1310), the ROI associated with the ROI label is targeted as a targeted ROI for interaction (block 1315). For example, in FIG. 6 the mouse pointer 620 is over an ROI label 625 of the first ROI 610 and, thus, the first ROI 610 is targeted for interaction and is highlighted.

Otherwise, if the mouse pointer is within the body of only a single ROI (block 1320), the ROI within which the mouse pointer is found is targeted as a targeted ROI for interaction (block 1315). For example, in FIG. 7 the mouse pointer 620 is only within the second ROI 615 and, thus, the second ROI 615 is targeted for interaction and is highlighted.

Otherwise, if the mouse pointer is within a threshold distance of a border (block 1325), an ROI is targeted as a targeted ROI for interaction based on distances from the mouse pointer to borders of presented ROIs by, for example, carrying out the example logic of FIG. 5 (block 1330). For example, in FIG. 14 the mouse pointer 620 is within a threshold distance 1405 of the border of the first ROI 610. Thus, according to the logic of FIG. 5, the first ROI 610 is targeted for interaction because the distance D1 from the mouse pointer 620 to the border of the first ROI 610 is smaller than the distance D2 from the mouse pointer 620 to the border of the second ROI 615.

Otherwise, if the mouse pointer is not within a threshold distance of a border (block 1325), an ROI is targeted as a targeted ROI for interaction based on distances from the mouse pointer to centers of presented ROIs by, for example, carrying out the example logic of FIG. 10 (block 1335). For example, in FIG. 15 the mouse pointer 620 is not within a threshold distance 1405 of the border of the first ROI 610. Thus, according to the logic of FIG. 10, the second ROI 610 is targeted for interaction because the distance D1 from the mouse pointer 620 to the center 1505 of the first ROI 610 is larger than the distance D2 from the mouse pointer 620 to the center 1510 of the second ROI 615.

In some embodiments, the user may configure a machine vision application (e.g., by providing a user configuration input) to select between ROI targeting modes. For example, they may switch between several different overlapping ROI targeting mode options based what a user/operator finds easiest, most intuitive, etc. The modes could include:

Dynamic targeting as described in connection with FIG. 13

Border targeting (closest border) as described in connection with FIG. 5

Center targeting (closest center) as described in connection with FIG. 10

Size targeting (smallest ROI)

Z-index targeting (selected or top ROI)

It should be appreciated that throughout this disclosure, references to input devices like a mouse should not be seen as limiting and other input devices should be considered to be within the scope of this disclosure. For example, it should be appreciated that in the event of a machine vision application being executed on a mobile device like a tablet or a notebook having touch-screen capabilities, a user's finger and the respective input functions via a screen may function just like the input functions of a computer mouse.

The processes, methods, software and instructions of FIGS. 4, 5, 10 and 13 may be executable programs or portions of executable programs (e.g., the smart imaging application 116, 136) for execution by a processor such as the processor 108, 128. The programs may be embodied in software and/or machine-readable instructions stored on a non-transitory, machine-readable storage medium. Further, although example flowcharts 400, 500, 1000 and 1300 are illustrated, many other methods of identifying an ROI to target for interaction may alternatively be used. For example, the order of execution of the blocks may be changed, and/or some of the blocks described may be changed, eliminated, or combined. Additionally, or alternatively, any or all of the blocks may be implemented by one or more of a hardware circuit (e.g., discrete and/or integrated analog and/or digital circuitry), application specific integrated circuit (ASIC), programmable logic device (PLD), field programmable gate array (FPGA), field programmable logic device (FPLD), logic circuit, etc. structured to perform the corresponding operation(s) without executing software or instructions.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A system for interacting with regions of interest (ROIs) in a machine vision application, the system comprising:
   a machine vision camera; and
   a client computing device coupled to the machine vision camera, wherein the client computing device is configured to:
      receive an image from the machine vision camera;
      present the image on a canvas, wherein the canvas is part of a first user interface of a machine vision application displayed on the client computing device;
      present a first ROI associated with a first machine vision tool on the canvas and over a first portion of the image;
      present a second ROI associated with a second machine vision tool on the canvas and over a second portion of the image; and
      while the first ROI is presented over the first portion of the image and while the second ROI is presented over the second portion of the image, target the first ROI or the second ROI as a targeted ROI for interaction based upon distances from a pointer displayed on the canvas to features of the first ROI and the second ROI,
   wherein the features of the first ROI and the second ROI include a feature of the first ROI and a feature of the second ROI, and wherein the client computing device is further configured to target the targeted ROI for interaction by:
      when the pointer is within only the first ROI, targeting the first ROI as the targeted ROI;
      when the pointer is within the first ROI and the second ROI, and the pointer is closer to the feature of the first ROI than to the feature of the second ROI, targeting the first ROI as the targeted ROI; and
      when the pointer is within the first ROI and the second ROI, is equidistant to the feature of the first ROI and to the feature of the second ROI, and is closer to a first center of the first ROI than to a second center of the second ROI, targeting the first ROI as the targeted ROI.

2. The system of claim 1, wherein the client computing device is further configured to, when the targeted ROI is selected by a first user input:
   modify the targeted ROI in response to a second user input to form a modified targeted ROI; and
   configure the machine vision camera to implement the machine vision tool associated with the targeted ROI based on the modified targeted ROI.

3. The system of claim 2, wherein the client computing device is further configured to, when the targeted ROI is selected by the first user input, present a second user interface on the display for configuring the machine vision tool associated with the targeted ROI.

4. The system of claim 1, wherein the feature of the first ROI is a first border, wherein the feature of the second ROI is a second border, and wherein the client computing device is further configured to target the targeted ROI for interaction by:
   when the pointer is within the first ROI and the second ROI, and the pointer is closer to the first border than to the second border, targeting the first ROI as the targeted ROI.

5. The system of claim 1, wherein the feature of the first ROI is a first center, wherein the feature of the second ROI is a second center, and wherein the client computing device is further configured to target the targeted ROI for interaction by:
  when the pointer is within the first ROI and the second ROI, and the pointer is closer to the first center than to the second center, targeting the first ROI as the targeted ROI.

6. The system of claim 1, wherein the client computing device is further configured to:
  receive a user configuration input; and
  select, based on the user configuration input, between (i) the features being boundaries of the first ROI and the second ROI and (ii) the features being centers of the first ROI and the second ROI.

7. The system of claim 1, wherein the client computing device is further configured to:
  receive a user configuration input; and
  select, based on the user configuration input, between (i) the features being boundaries of the first ROI and the second ROI, (ii) the features being centers of the first ROI and the second ROI, and (iii) the features representing which of the first ROI and the second ROI is selected or on top.

8. The system of claim 1, wherein the client computing device is further configured to:
  highlight the targeted ROI;
  target a different ROI as the targeted ROI when the pointer is moved around the canvas; and
  highlight the different ROI.

9. A method for interacting with regions of interest (ROIs) in a machine vision application, the method comprising:
  presenting a first user interface on a display, the first user interface including a canvas with an image;
  presenting a first ROI associated with a first machine vision tool on the canvas and over a first portion of the image;
  presenting a second ROI associated with a second machine vision tool on the canvas and over a second portion of the image;
  while the first ROI is presented over the first portion of the image and while the second ROI is presented over the second portion of the image, targeting the first ROI or the second ROI as a targeted ROI for interaction based upon distances from a pointer displayed on the canvas to features of the first ROI and the second ROI;
  modifying the targeted ROI in response to a first user input; and
  configuring a machine vision camera to implement the machine vision tool associated with the targeted ROI based on the modified targeted ROI
  wherein the features of the first ROI and the second ROI include a feature of the first ROI and a feature of the second ROI, and wherein targeting the targeted ROI for interaction includes:
    when the pointer is within only the first ROI, targeting the first ROI as the targeted ROI;
    when the pointer is within the first ROI and the second ROI, and the pointer is closer to the first border than to the second border, targeting the first ROI as the targeted ROI; and
    when the pointer is within the first ROI and the second ROI, is equidistant to the first border and to the second border, and is closer to a first center of the first ROI than to a second center of the second ROI, targeting the first ROI as the targeted ROI.

10. The method of claim 9, further comprising, when the targeted ROI is selected in response to a second user input, presenting a second user interface for configuring the machine vision tool associated with the targeted ROI.

11. The method of claim 9, wherein the feature of the first ROI is a first border, wherein the feature of the second ROI is a second border, and wherein targeting the targeted ROI for interaction includes:
  when the pointer is within the first ROI and the second ROI, and the pointer is closer to the first border than to the second border, targeting the first ROI as the targeted ROI.

12. The method of claim 9, wherein the feature of the first ROI is a first center, wherein the feature of the second ROI is a second center, and wherein targeting the targeted ROI for interaction includes:
  when the pointer is within the first ROI and the second ROI, and the pointer is closer to the first center than to the second center, targeting the first ROI as the targeted ROI.

13. The method of claim 9, further comprising:
  receiving a user configuration input; and
  selecting, based on the user configuration input, between (i) the features being boundaries of the first ROI and the second ROI and (ii) the features being centers of the first ROI and the second ROI.

14. The method of claim 9, further comprising:
  highlighting the targeted ROI;
  targeting a different ROI as the targeted ROI when the pointer is moved around the canvas; and
  highlighting the different ROI.

* * * * *